(12) United States Patent
Horvat

(10) Patent No.: US 12,129,614 B2
(45) Date of Patent: Oct. 29, 2024

(54) WALL STRUCTURES WITH SOLID-WASTE FILL-MATERIAL

(71) Applicant: Louis Structures, LLC, Sheboygan, WI (US)

(72) Inventor: Benjamin Horvat, Sheboygan, WI (US)

(73) Assignee: Louis Structures, LLC, Sheboygan, WI (US)

( * ) Notice: Subject to any disclaimer, the term of this patent is extended or adjusted under 35 U.S.C. 154(b) by 0 days.

(21) Appl. No.: 18/115,505

(22) Filed: Feb. 28, 2023

(65) Prior Publication Data

US 2023/0235520 A1    Jul. 27, 2023

Related U.S. Application Data

(63) Continuation of application No. 15/986,491, filed on May 22, 2018, now abandoned.

(60) Provisional application No. 62/509,706, filed on May 22, 2017.

(51) Int. Cl.
*E02D 29/02*    (2006.01)
*E01F 8/00*    (2006.01)

(52) U.S. Cl.
CPC .......... *E01F 8/0023* (2013.01); *E01F 8/0017* (2013.01); *E02D 29/02* (2013.01); *E02D 29/0225* (2013.01)

(58) Field of Classification Search
CPC . E02D 29/02; E02D 29/0225; E02D 29/0233; E02D 29/0241; E02D 29/0266
See application file for complete search history.

(56) References Cited

U.S. PATENT DOCUMENTS

| | | | | |
|---|---|---|---|---|
| 5,464,473 A | * | 11/1995 | Shiao | C04B 28/001 588/16 |
| 8,845,237 B2 | * | 9/2014 | Freitag | E02D 29/0241 405/262 |
| 2011/0135394 A1 | * | 6/2011 | Dudding | E02D 17/18 405/129.6 |

* cited by examiner

*Primary Examiner* — Sean D Andrish
(74) *Attorney, Agent, or Firm* — Jansson Munger McKinley & Kirby Ltd.

(57) ABSTRACT

A barrier-wall structure having a retaining wall with a back support surface supported by backfill adjacent thereto, wherein the backfill is municipal solid waste processed into fill-material in the form of a multiplicity of biologically-inert compacted pieces.

6 Claims, 6 Drawing Sheets

WALL STRUCTURES WITH SOLID-WASTE FILL-MATERIAL

RELATED APPLICATIONS

This application is a continuation of patent application Ser. No. 15/986,491, filed on May 22, 2018, which claims the benefit of provisional application Ser. No. 62/509,706, filed on May 22, 2017, the entire contents of such applications being incorporated herein by reference.

FIELD OF THE INVENTION

This invention relates generally to barrier-wall structures and more specifically to materials and configurations for such barrier-wall structures and methods for preparing such materials, and also to solutions to problems related to dealing with municipal solid waste.

BACKGROUND OF THE INVENTION

The need for improved barrier-wall structures, such as wall structures for border usage aimed at minimizing improper or unauthorized border crossings and facilitating the guarding of a border, has been a matter of great interest, concern and controversy. Aside from the public controversies and debates based on differing philosophical viewpoints with respect to national sovereignty and security, there are very practical issues feeding the debates.

Perhaps most notable among the practical concerns are the projected high costs and the related matters of who should pay for a barrier wall, or how to fund a barrier-wall structure along much of the southern border of the United States. Other practical matters of concern are about the adequacy of some barrier-wall structures to fulfill their intended purposes, regulatory concerns, and even concerns related to aesthetics. On the latter point, while the Great Wall of China, for example, has long been a tourist attraction, very few people are advancing any similar thought with respect to a barrier wall along much of the southern border of the United States. The concerns are much more practical in nature, with cost and funding topping the list.

In addition to the above-described needs regarding border walls, an even larger need exists with respect to barrier walls of the sort used along highways for sound control and other purposes. Great lengths of such barrier walls are built, and it is therefore desirable to find cost-effective ways of building such walls.

Another major but seemingly unrelated societal concern is the mounting problem of what to do about vast and increasing amounts of municipal solid waste (MSW). Waste generation continues to grow faster than the population. The ever-increasing MSW streams pose challenges in handling and disposing, and there are enormous costs and myriad problems imposed on government and private entities.

In a typical arrangement for dealing with municipal solid waste, a private waste-management company carries out oversight and operation of a landfill. The economics of the arrangement generally involve a waste removal and disposal payment made by the community to the company based on the amount of solid waste collected and removed. Communities and companies competing with one another typically engage in bidding and negotiating to arrive at an agreement, with desiring contracts involving a sufficient on-going waste volume to maintain company profitability. While this business model has proved reliable in the past, the current pace of solid waste production means that both communities and companies need innovative approaches to waste management.

A great deal of the current research and innovation related to MSW management is focused on extending the life and performance of existing landfills. However, these sorts of efforts are generally shortsighted in that they tend to merely show how to extend the lives of landfills for a few years, rather than solve the underlying need for sustained economic development in our communities. What is needed are more and better systems and methods for dealing with MSW. Processing municipal waste in order to create usable products is one approach. In fact, entire industries exist based on processing MSW, and on finding and implementing various uses for processed MSW having purpose-driven characteristics. There remains a pressing need for systems and methods that effectively reduce the total volume of solid waste and increase the reuse of byproducts of MSW processing.

There is a very apparent and growing concern about being able to find suitable new landfill sites. Increases in rates of waste disposal and reduced public acceptance of constructing and operating traditionally-designed MSW facilities create a deficit of MSW landfill space that must constantly be addressed by government and solid-waste companies. Landfills are viewed as liabilities, both in the economic sense and the community-development sense. There is a need for a paradigm shift from the present landfill-as-liability point of view to more of a landfill-as-asset point of view.

Various objects of the invention are apparent from the above background discussion and will be apparent from the descriptions and illustrations of various aspects of the present invention which now follow.

BRIEF DESCRIPTION OF THE INVENTION

One aspect of this invention is an economical barrier-wall structure for uses such as border protection. The barrier-wall structure includes a pair of parallel retaining walls defining a space therebetween; fill-material within the space, the fill-material including processed solid waste; and a layered covering structure over and supported by the fill-material and extending between the pair of parallel retaining walls. This aspect of the invention is embodied in various preferred forms.

The term "solid waste" as used herein means solid waste such as municipal solid waste (MSW), commonly referred to as trash or garbage and consisting of everyday items discarded by the public, either alone or supplemented by waste materials of other sorts allowing processing in the ways described herein. The processing of such solid waste, to produce what is referred to herein by the term "processed solid waste," is described later in this document. Such solid-waste processing to create useful stable solid fill-material is an alternative to placing solid waste into landfills; i.e., recently-collected MSW is what is converted. However, the solid-waste processing described herein can instead convert solid-waste removed from landfills in order to create the useful stable solid fill-material.

Highly preferred embodiments of the inventive barrier-wall structure preferably include two pluralities of vertically-spaced geosynthetic grid layers, the grid layers of each plurality each having a proximal edge secured to one of the retaining walls and extending therefrom toward the other retaining wall, the vertically-spaced grid layers having fill-material between successive vertically-spaced geosynthetic grid layers. A typical vertical spacing may be on the order of two feet; i.e., a fill-material layer about two feet thick may exist between successive vertically-spaced grid layers. Such arrangements of geosynthetic grid layers enhance the stability of the fill-material and serve to enhance the stability of positions of the retaining walls and other elements of such barrier-wall structures.

In preferred embodiments of this invention, the fill-material extends between the two retaining walls. In such barrier-wall structures, each retaining wall has a ground-intersecting lower edge (i.e., the line along the retaining wall at which the vertical plane of the retaining wall intersects the horizontal surface of the ground) and an upper-edge structure. And, in the preferred barrier-wall structures having fill-material extending between the retaining walls, it is highly preferred that the fill-material substantially fill the space from between the ground-intersecting lower edges and the upper-edge structures. Stated differently, this preferred embodiment means that the space between the retaining walls is entirely filled, or substantially entirely filled, with the fill-material.

Such preferred embodiments preferably include two pluralities of vertically-spaced geosynthetic grid layers, as described above. Most preferably, each of the geosynthetic grid layers has a distal edge and the grid layers of each plurality each extend toward the other retaining wall to positions beyond the distal edges of the grid layers extending from the other retaining wall. This overlapping configuration of geosynthetic grid layers is particularly effective in providing the aforementioned stability of parts and elements of the barrier-wall structure.

In certain highly-preferred embodiments, processed solid-waste of the barrier-wall structure includes at least one stabilizing material added thereto which enhances the mechanical properties of the fill-material. Additive-enhanced fill-material forms at least one portion of the fill-material in the space between the retaining walls, the remaining portions of the fill-material not being additive-enhanced. In such embodiments, at least some of the grid layers extend into the additive-enhanced portion of fill material. The at least one portion of additive-enhanced fill-material is preferably centrally located between the retaining walls, i.e., such portion is in a generally central portion as opposed to being immediately adjacent to the retaining walls.

In highly-preferred embodiments of this invention, the processed solid-waste fill-material comprises a multiplicity of compacted pieces, the multiplicity of pieces together having a density and friction angle acceptable for structural fill use. Preferably, the density is within the range of about 115-130 pounds per cubic foot and the friction angle is within the range of about 20-34 degrees, and most preferably within the range of about 28-34 degrees. Such solid-waste fill-material provides very satisfactory properties when it comes to providing stability of the elements of the barrier-wall structures.

Also, the processed solid-waste fill-material preferably meets the AASHTO LRFD (the American Association of State Highway and Transportation Officials Load and Resistance Factor Design) criteria for a backfill promulgated by the United States Department of Transportation and similar specifications of other regulatory agencies and may meet the criteria for a Beneficial Use Permit as promulgated by the United States Environmental Protection Agency and similar specifications of other regulatory agencies. More specifically, at the time of the filing of this patent, the criteria for a backfill promulgated by the United States Department of Transportation are as published in AASHTO LRFD Bridge Design Specifications, 8th Edition, September 2017 by the American Association of State Highway and Transportation Officials. The specific pertinent portion is in Section 11: Walls, Abutments, and Piers; Subsection 11.10 MECHANICALLY STABILIZED EARTH WALLS; Part 11.10.6—Safety against Structural Failure (Internal Stability).

In preferred embodiments, the solid-waste fill-material is sufficiently compacted to permit vehicular transport on top of the wall structure. Preferably, the layered covering structure is upwardly convex with its uppermost portion parallel to the retaining walls. Most preferably, the layered covering structure includes at least one clay earthen layer, a water-impervious polymeric-sheet layer, and a drivable topmost layer. The topmost layer may be a spray-on concrete protective covering.

Preferred embodiments of the barrier-wall structures of this invention also include a water-impervious liner (such as a polymeric liner) below the fill-material and sloping toward a collection point. Such liner serves to prevent any leachate from the fill-material from draining into the ground and its sloping serves to direct leachate to the collection point. It should be noted, however, that inertness of the fill-material may remove any need for dealing with leachate.

In preferred embodiments of this barrier-wall structure, each retaining wall includes a multiplicity of wall panels. In some such embodiments, the structure also includes tensioning cables each of which is attached at its opposite ends to panels of the parallel retaining walls and extends across the space therebetween. This is one direct means that may be used to provide enhanced stability to the barrier-wall structure. In the barrier-wall structure of this invention, each retaining wall preferably includes pre-cast concrete panels.

In certain preferred embodiments of the inventive barrier-wall structure, each retaining wall has a main wall portion with a top edge and an upper-edge structure which is secured to the top edge, such upper-edge structure having outward and upward convexity. This serves to frustrate efforts to use lines with grappling hooks to scale the wall and get on top of the barrier-wall structure. Such upper-edge structures preferably include well-placed drainage holes to facilitate drainage of rain water and the like from the top of the barrier-wall structure.

The barrier-wall structures of this invention have been described thus far with specific reference to barrier-wall structures for uses such as border protection. However, as indicated earlier in this document, another important aspect of this invention is barrier-wall structures involving a single retaining wall rather than a pair of spaced retaining walls. Such single-retaining-wall barrier-wall structures are of the type frequently along major highways.

This aspect of the invention is a barrier-wall structure of the type having a retaining wall with a front surface (typically facing a highway) and a back support surface (typically facing away from a highway), the back support surface being supported by backfill adjacent thereto. The improvement of this invention involves the nature of the backfill, which in this invention is the processed solid-waste fill-material which is described above.

Preferred barrier-wall structures of this aspect of the invention further include a plurality of vertically-spaced geosynthetic grid layers, the grid layers each having a proximal edge secured at the back support surface and extending therefrom into the fill-material, the vertically-spaced grid layers having fill-material therebetween, as described above.

In certain preferred embodiments of this aspect of the invention, the processed solid-waste fill-material includes at least one stabilizing material added thereto, thereby enhancing the mechanical properties of the fill-material.

And, as described above, the processed solid-waste fill-material preferably is a multiplicity of compacted pieces, the multiplicity of pieces together having a density and friction angle acceptable for structural fill use. Most preferably, as described above, the density is within the range of about 115-130 pounds per cubic foot and the friction angle is within the range of about 20-34 degrees, and most preferably within the range of about 28-34 degrees. And such processed solid-waste fill-material preferably meets the AASHTO LRFD criteria for a backfill promulgated by the United States Department of Transportation and similar specifications of other regulatory agencies and may meet the criteria for a Beneficial Use Permit as promulgated by the United States Environmental Protection Agency and similar specifications of other regulatory agencies.

As with the two-retaining-wall aspect of this invention, certain embodiments having a single retaining wall further include a water-impervious liner below the fill-material and sloping toward a collection point.

Each of the versions of the barrier-wall structures of this invention described above creates what is in effect new substantial repositories for municipal waste, albeit processed municipal waste, thereby relieving the ever-increasing demand for landfill spaces and sites. And, given that municipalities and other generators of solid waste pay substantial amounts for collection and removal of solid waste, an economical supply of material is provided for processing and use for structure-related purposes. Furthermore, as indicated above, removal of long-stored solid waste from landfills can provide a vast additional source of solid waste for processing and use for structure-related purposes.

This invention involves a purpose-driven approach to two entirely separate sorts of problems, and serves to significantly reduce costs associated with major kinds of barrier-wall structures. While not wanting to be bound by theoretical considerations, this invention is based in part on the realization that appropriate processing of municipal solid waste can provide valuable backfill material for use in unique barrier-wall structures.

Another aspect of the present invention is a method for converting solid waste, whether from current (just collected) municipal solid waste or solid waste removed from a landfill where it has long been situate, to a stable solid fill-material—i.e., fill-material in the form of a multiplicity of compacted pieces.

The inventive method includes: mechanically reducing solid-waste piece size to form a first stream of solid waste; removing ferrous and non-ferrous metals from the second stream; thereafter dividing the second stream into high-density and low-density streams using a separation system; separately mechanically reducing solid-waste size of the high-density and low-density streams; separately heating the high-density and low-density streams and thereby killing bacteria in such streams; separately buffering the high-density and low-density streams; blending controlled amounts of the high-density and low-density streams in a mixer to form a blended stream; adding an antimicrobial agent to the blended stream; and pelletizing the blended stream.

A variation of the method just described replaces the sequential "dividing" and "heating" steps with the following differing sequence of two steps: drying the solid-waste stream and thereby killing bacteria in such stream; and thereafter dividing the stream into high-density and low-density streams.

In some preferred embodiments of the invention, the blending step includes the addition of a binder.

In some preferred embodiments, the dividing step is carried out with an air separation system.

In some preferred embodiments, the method further includes separately mechanically reducing solid-waste piece size of the high-density and low-density streams after the heating such streams.

Certain embodiments of the invention may include the step of adding an antimicrobial agent as a coating to the pellets, may include the step of steaming the blended material during the pelletizing step to kill remaining bacterial spores, and may include the step of cooling the pellets.

Some preferred embodiments of the inventive method may include the steps of separately buffering the pellets in at least one buffering container and mixing pellets from the at least one buffering container to form an output stream.

In highly-preferred embodiments of the invention, the multiplicity of compacted pieces of solid fill-material together has a density and friction angle acceptable for structural fill use. In some of these embodiments, the density is within the range of about 115-130 pounds per cubic foot and the friction angle is within the range of about 20-34 degrees.

Some embodiments of the inventive method may include the step of removing disallowed materials prior to reducing solid-waste piece size to form the first stream of solid waste, and in some embodiments, the inventive method may include the step of removing disallowed materials after reducing solid-waste piece size to form the first stream of solid waste.

In highly-preferred embodiments, the heating of the high-density and low-density streams includes drying of such streams.

In some preferred embodiments of the inventive method, the blending step includes the addition of activated charcoal.

Equipment usable for each of the steps of the aforementioned method is available to facilitate practice of such method, and acceptable choices would be apparent to those familiar with the present invention. The steps of mechanically reducing solid-waste piece size may be carried out with a variety of equipment, such as equipment for cutting, chopping, shredding or coarse-grinding.

Given the desirability of having processed solid-waste fill-material with final bulk density at acceptable levels and not unacceptably varying, highly-preferred embodiments of the method of this invention include, in addition to the steps outlined above, the step of conveying pellets to separate storage containers (buffering) for later custom mixing of pellets to control final bulk density of an output pellet stream.

The method of this invention is described in substantial detail above. More broadly, the method of this invention for converting solid waste to a stable solid fill-material includes the following steps: mechanically reducing solid-waste piece size to form a solid-waste stream; heating the solid-waste stream and thereby killing bacteria in such stream; adding an antimicrobial agent to the solid-waste stream; and pelletizing the blended stream.

Some embodiments of the inventive method may include the steps of, prior to heating, dividing the mechanically-reduced solid-waste stream into high-density and low-density streams, and after heating, blending the high-density and low-density streams to form a blended stream. Some other embodiments may include both the dividing and blending steps after heating.

As in the above more detailed description of the method, this more broad embodiment may include one or more of the following additional steps: the addition of a binder in the blending step; the addition of activated charcoal in the blending step; coating the pellets with an antimicrobial agent; and removing metallic material from the solid-waste stream.

In some preferred embodiments, the pelletizing step includes forming pellets of more than one size and combining the pellets into a single mix of pellets. Such pellet mixing tends to better fill voids which would be present without mixing smaller pellets with larger pellets.

When the solid waste processed in accordance with the above-described methods is solid waste from one or more landfills, the method of this invention preferably includes the further step of capturing methane which is released from the mass of solid waste during the various processing steps.

Certain terms used in this document will be fully understood by reference to the following definitions:

The term "disallowed materials" as used herein means waste items such as liquid paint, solvents, insecticides, unacceptably-large assembled manufactured devices, large metallic objects and anything else that would not be susceptible to the remaining steps of the process.

The term "buffering" as used herein means the process of storing a stream of material and later removing the stream from storage for purposes of later blending with another stream.

The term "pellet" as used herein means a small compacted piece of material without regard to the specific cross-sectional shape or aspect ratio; as used herein, pellets can have without limitation circular, rectangular or other cross-sections and be of varying lengths—typically no more than a few inches in largest dimension.

BRIEF DESCRIPTION OF THE DRAWING FIGURES

DETAILED DESCRIPTIONS OF PREFERRED EMBODIMENTS

Figure 1:
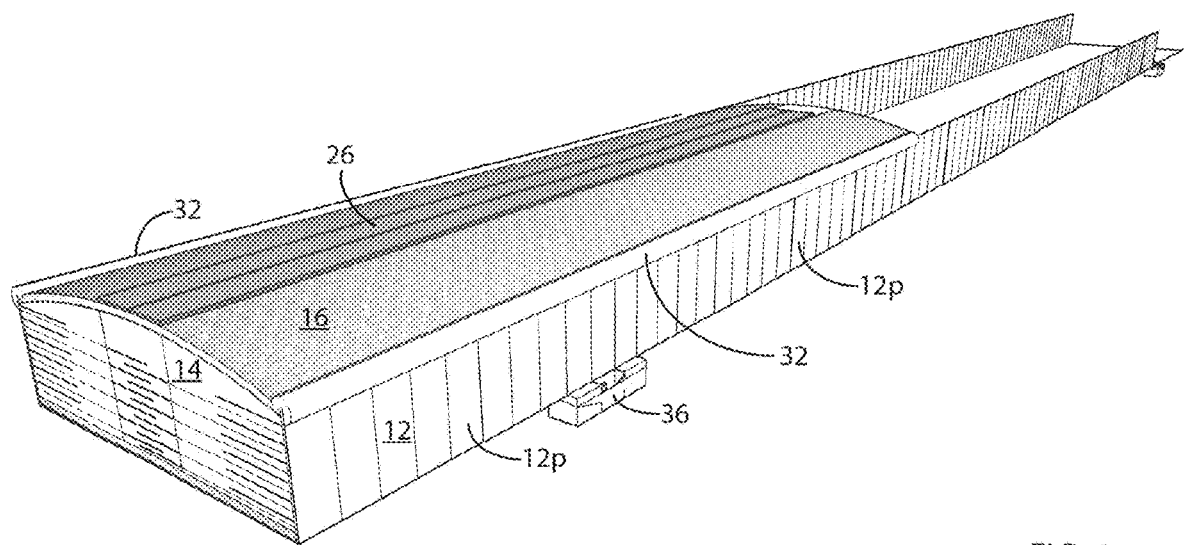
FIG. 1 is a perspective drawing of one section of an embodiment of the barrier-wall structure of this invention. The drawing includes a cross-sectional view of the barrier-wall structure.
Figure 2:
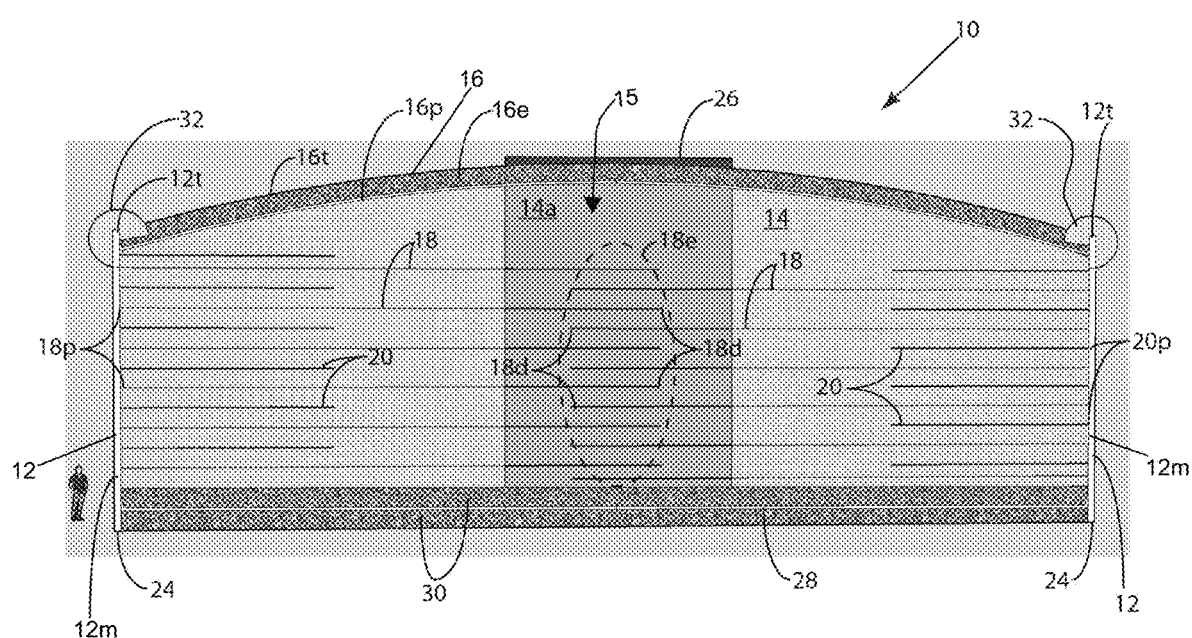
FIG. 2 is a cross-sectional drawing of the barrier-wall structure embodiment of FIG. 1.

FIG. 1 is a perspective drawing of one section of an embodiment 10 of the barrier-wall structure of this invention, and FIG. 2 is a cross-sectional drawing of the barrier-wall structure embodiment of FIG. 1. Some reference numbers are more conveniently placed in one of FIGS. 1 and 2; please refer to these figures as necessary.

Barrier-wall structure embodiment 10 includes: (a) a pair of parallel retaining walls 12 which define a space between walls 12; (b) fill-material 14 within the space between walls 12, fill-material 14 including processed solid waste; and (c) a layered covering structure 16 over and supported by fill-material 14 and extending between parallel retaining walls 12. Each retaining wall 12 includes a multiplicity of pre-cast concrete wall panels 12$p$.

Embodiment 10 also includes two pluralities of vertically-spaced geosynthetic grid layers 18. Grid layers 18 of each plurality have a proximal edge 18$p$ secured to one of the retaining walls 12, and grid layers 18 extend from wall 12 to which they are secured toward the other retaining wall 12. Grid layers 18 are vertically-spaced and have fill-material 14 between successive vertically-spaced geosynthetic grid layers 18. Suitable geosynthetic grid layers 18 are available at least from Tensar International Corporation of Alpharetta, Georgia.

In embodiment 10 of the barrier-wall structure, fill-material 14 extends between the two retaining walls. Each retaining wall 12 has a ground-intersecting lower edge 24 (i.e., the line along retaining wall 12 at which the vertical plane of retaining wall 12 intersects the horizontal surface of the ground) and an upper-edge structure 32, and fill-material 14 extends between retaining walls 12, substantially filling the space from between ground-intersecting lower edges 24 and upper-edge structures 22. That is, in embodiment 10, the space between retaining walls 12 is entirely filled, or substantially entirely filled, with fill-material 14.

In embodiment 10, each of geosynthetic grid layers 18 has a distal edge 18$d$, and grid layers 18 of each plurality each extend toward the other retaining wall 12 to positions beyond distal edges 18$d$ of grid layers 18 which extend from the other retaining wall 12 to form an overlapping region 18$e$ which is particularly effective in providing stability to barrier-wall structure embodiment 10.

Embodiment 10 also includes a central portion 15 (see arrow from numeral 15) filled with fill material 14$a$ to which at least one stabilizing material (binder) has been added to enhance the mechanical properties of fill-material 14$a$, and distal edges 18$d$ are located in central portion 15. Fill-material 14$a$ in central portion 15 may contain additives such as cement or a polymeric binder; such list of additives is not intended to be limiting. Remaining filled space contains fill-material 14 which has not been enhanced with additive.

Embodiment 10 also includes two pluralities of vertically-spaced geosynthetic grid layers 20 which are shorter in length than grid layers 18. Grid layers 20 of each plurality have a proximal edge 20$p$ secured to one of the retaining walls 12, and grid layers 20 extend from wall 12 to which they are secured toward the other retaining wall 12 but do not extend to form an overlapping configuration of grid layers like grid layers 18. Grid layers 20 are vertically-spaced and have fill-material 14 between successive vertically-spaced geosynthetic grid layers 20. It should be noted that other embodiments similar to embodiment 10 are possible such as embodiments which include either grid layers 18 or grid layers 20 but not both.

Figure 3:
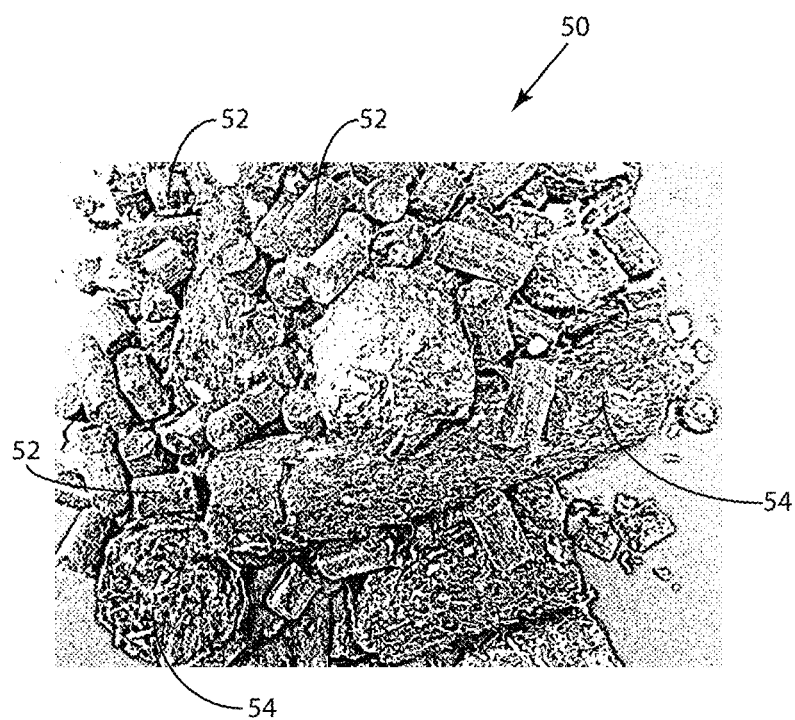
FIG. 3 is an illustration of some compacted pieces of processed solid waste, such pieces being pellets of different sizes.

FIG. 3 is an illustration of a pile 50 of pellets 52, 54 which are compacted pieces of processed solid waste (fill-material 14). Pellets 52, 54 are of several different sizes such that pile 50 may be more effectively packed in the space between walls 12. This occurs because smaller pellets 52 can fit in the interstitial spaces between larger pellets 54. For example, larger pellets may be largest dimension of about five inches or less while the size(s) smaller pellets are chosen to assist in filling voids between pellets.

Fill-material 14 is processed such that a multiplicity of pieces together have a bulk density and friction angle acceptable for structural fill use. Preferably, the bulk density is within the range of about 115-130 pounds per cubic foot, and the friction angle is within the range of about 20-34 degrees, and most preferably within the range of about 28-34 degrees. As described above, the processed solid-waste fill-material 14 preferably meets the AASHTO LRFD criteria for a backfill promulgated by the United States Department of Transportation, as published in AASHTO LRED Bridge Design Specifications, 8$^{th}$ Edition, and similar specifications of other regulatory agencies. Fill-material 14 may also meet the criteria for a Beneficial Use Permit as promulgated by the United States Environmental Protection Agency.

Referring again to FIGS. 1 and 2, in embodiment 10, fill-material 14 and 14a is sufficiently compacted to permit vehicular transport on top of the wall structure. Layered covering structure 16 is upwardly convex with its uppermost portion parallel to retaining walls 12. Layered covering structure 16 includes a clay earthen layer 16e, a water-impervious polymeric-sheet layer 16p, and a drivable topmost layer 16t. Topmost layer 16t may be a spray-on concrete protective covering, and in embodiment 10 further includes an additional road portion 26 over central portion [14a] 15. Materials such as commonly-known 60 mil polyethylene sheet may be used for impervious polymeric-sheet layer 16p; such material is not intended to be limiting.

Barrier-wall structure embodiment 10 also includes a water-impervious liner 28 below fill-material 14,14a and sloping toward a collection point 36 (see FIG. 1). Bottom liner 28 serves to prevent any leachate from fill-material 14,14a from draining into the ground. The slope of bottom layer 28 may be about 2 degrees and directs leachate to collection point 36. (The slope of bottom layer 28 in embodiment 10 is down toward the right side of FIG. 1.) It should be noted that the inertness of fill-material 14,14a may eliminate the need for leachate handling. Bottom liner 28 is layered between two clay earthen layers 30.

In embodiment 10, each retaining wall 12 has a main wall portion 12m with a top edge 12t and an upper-edge structure 32. Upper-edge structure 32 is secured to top edge 12t and has outward and upward convexity which serves to frustrate efforts to use lines with grappling hooks to scale the wall and get on top of the barrier-wall structure. Such upper-edge structures 32 may include well-placed drainage holes (not shown in the cross-section of FIG. 2) to facilitate drainage of rain water and the like from barrier-wall structure embodiment 10.

Figure 4:
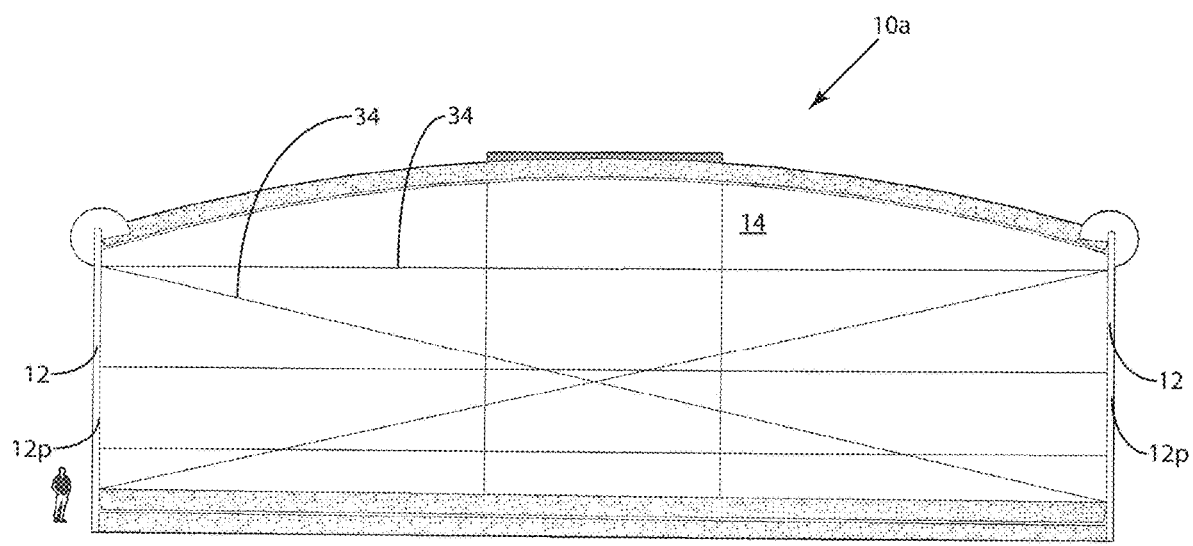
FIG. 4 is a cross-sectional drawing of an alternative embodiment of the barrier-wall structure of this invention, such alternative including tensioning cables secured to and extending between the parallel retaining walls.

FIG. 4 is a cross-sectional drawing of an alternative embodiment 10a of the barrier-wall structure of this invention, such alternative including tensioning cables 34 secured to and extending between parallel retaining walls 12. FIG. 4 shows three generally horizontal cables and two diagonal cables; only two such cables 34 are labeled with reference numbers. Each tensioning cable 34 is attached at its opposite ends to pre-cast concrete panels 12p of parallel walls 12 and extends across the space between such parallel walls 12. In addition to providing enhanced stability to retaining walls 12, cables 34 may also effect some compaction of fill-material 14 after the filling of barrier-wall structure embodiment 10a with fill-material 14.

Figure 5:
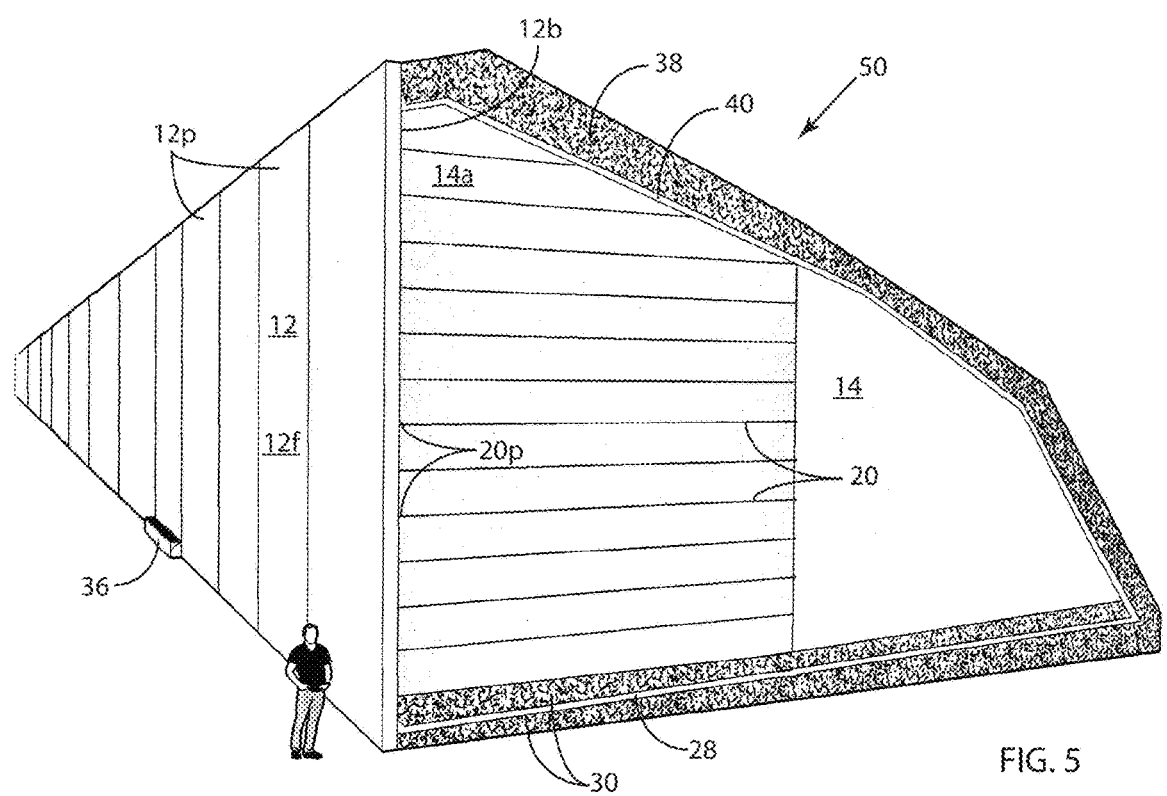
FIG. 5 is a perspective drawing of an embodiment of a barrier-wall structure of this invention in which the structure includes a single retaining wall. The drawing includes a cross-sectional view of the barrier-wall structure.

FIG. 5 is a cross-sectional drawing of an embodiment 50 of a barrier-wall structure of this invention in which the barrier-wall structure includes a single retaining wall 12 including pre-cast concrete panels 12p. Retaining wall 12 has a front surface 12f and a back support surface 12b. Back support surface 12b is supported by backfill which is processed solid-waste fill-material 14 and/or stabilizing-additive-containing fill-material 14a.

Single-wall embodiment 50 includes a plurality of vertically-spaced geosynthetic grid layers 20, and each of the grid layers has a proximal edge 20p secured at back support surface 12b and extending therefrom into fill-material 14a which is between vertically-spaced grid layers 20. Such configuration is not intended to be limiting; the backfill in embodiment 50 may be fill-material 14 or 14a or a combination thereof.

Embodiment 50 includes a top layer 38 and a water-impervious liner 40 on top of fill-material 14,14a. In similar fashion to embodiment 10, embodiment 50 also includes a water-impervious liner 28 below fill-material 14,14a and sloping toward collection point 36. Bottom liner 28 serves to prevent any leachate from fill-material 14,14a from draining into the ground. The slope of bottom layer 28 may be about 2 degrees and directs leachate to collection point 36. Bottom liner 28 is layered between two clay earthen layers 30.

Figure 6:
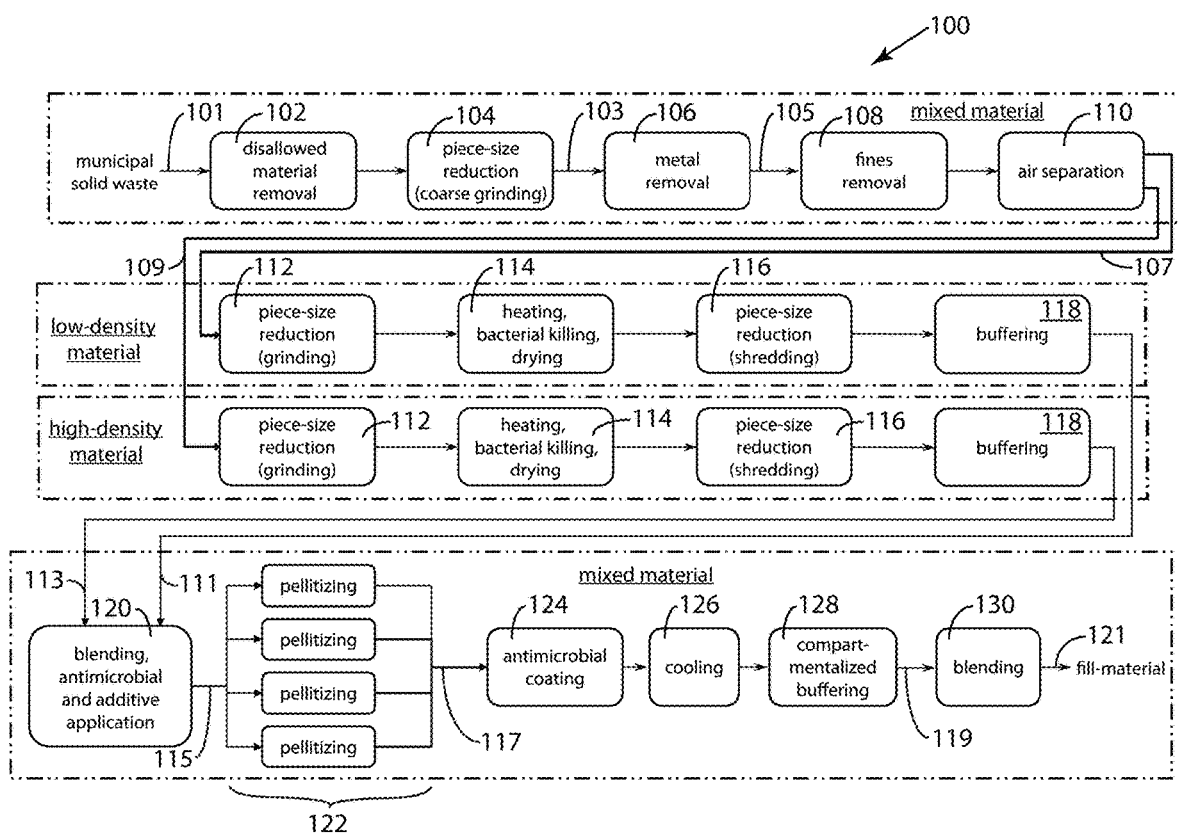
FIG. 6 is a schematic block diagram of an embodiment of the inventive method disclosed herein to convert solid waste to a stable solid fill-material in the form of a multiplicity of compacted pieces.

FIG. 6 is a schematic block diagram of an embodiment 100 of the inventive method disclosed herein to convert solid waste to a stable solid fill-material 14 in the form of a multiplicity of compacted pieces. The various steps of method embodiment 100 are often referred to below as "method elements." As can be appreciated, some of the method elements included in embodiment 100 may be optional; modifications to embodiment 100 are possible.

An input stream 101 of MSW is entered into method embodiment 100 generally using trucks which haul the MSW immediately after collection or from a landfill. At method element 102, disallowed materials are removed from the MSW-101. Disallowed materials may include but are not limited to objects such as propane tanks and containers of solvents. In method element 104, the MSW is then coarse-ground to reduce the piece size of the waste to be further processed, forming a first stream 103 of solid-waste. Piece sizes in first stream 103 may be about six inches or less in their largest dimension. This exemplary dimension is not intended to be limiting. At method step 106, both ferrous and non-ferrous metals are removed from first stream 103. Metal removal may be carried out using an eddy-current-sensor separator to form a second stream 105 of solid waste. Ferrous metal may also be removed using magnetic separation.

In method embodiment 100, fines which are present in second stream 105 are removed. In method step 110, second stream 105 is mechanically separated into a low-density stream 107 and a high density stream 109 using an air separation system. (The term "mechanically" is used here to describe the fact that the separation is done on the basis of density, a physical property of the solid waste rather than a chemical or electrical property of the solid waste. Therefore, as used herein, air separation is a mechanical process.)

In the next few method steps of embodiment 100, the separate streams 107 and 109 are processed separately, and method elements 112, 114, 116, and 118 are shown as being used to process streams 107 and 109 in this fashion. Although the specific equipment and/or process settings for the two streams may vary somewhat, the basic method elements are the same. Thus, in two method elements 112, low-density stream 107 and high-density stream 109 are separately ground to further reduce the piece size of the solid waste in streams 107 and 109. Such further-reduced piece sizes in streams 107 and 109 may be about 2 inches or less in their largest dimension. This exemplary dimension is not intended to be limiting. Streams 107 and 109 are then heated in method elements 114 to kill the bacteria present in streams 107 and 109, and drying may also occur depending on the moisture content of streams 107 and 109. Heating may be carried out by the application of steam. The killing of bacteria requires the solid waste material to reach a temperature at or above 160° F., but it is important that the temperature of streams 107 and 109 not be too much higher than that which is required for bacterial killing in order to prevent the melting of plastics which may be present therein.

The moisture content of streams 107 and 109 may vary considerably with variations in material content and weather. Thus, the amount of drying which may occur in method elements 114 may vary a large amount over such a wide range moisture content.

In embodiment 100, low-density stream 107 and high-density stream 109 are ground separately to further reduce the piece size of the solid waste in streams 107 and 109. Yet again further-reduced piece sizes in stream 107 and 109 may be about 0.5 inches or less in their largest dimension. As earlier indicated, exemplary dimensions are not intended to be limiting. As alluded to above, method elements 116 may be considered to be optional elements of the method depending on the needs of processing conditions. Then, method elements 118 represent the separate buffering of low-density stream 107 and high-density stream 109. Buffering 118 serves to smooth out the variations in the rate and content of solid-waste flow and permits control of the ratio of material from streams 107 and 109, to make adjustments to the density of a solid-waste stream 115 flowing out of the subsequent method element 120 by controlling the rates of flow in a low-density stream 111 and a high-density stream 113 flowing as inputs to method element 120.

In method element 120, the solid waste in streams 111 and 113 are blended and an antimicrobial agent is added to further kill bacteria and other living organisms and to control such organisms long-term. An antimicrobial as such from the Kathon™ product family of biocide chemicals available from Dow Chemical Company of Midland, Michigan, may be used; such antimicrobial agent is not intended to be limiting; other such agents are also candidates for usage in fill-material 14. In method element 120, additives such as fill-material stabilizers to produce fill-material 14a and/or activated charcoal are also inserted into the processed solid waste. Fill-material stabilizers such as but not limited to cement and polymeric binders may be used. Activated charcoal may be used to sequester any leachate which may be present within fill-material 14.

Next, at method elements 122 in method embodiment 100, solid-waste stream 115 is pelletized into a stream 117 of the multiple compacted pieces for fill-material 14 or 14a. Four pelletizers are shown processing stream 115 in parallel. The size of the pellets produced in the pelletizing step 122 may be the same in each of the pelletizers or may differ among the pelletizers. Different size pellets produces a final mix of pellets which enables smaller pellets to fit within the interstitial spaces around larger pellets. Pellets of different shapes may also be produced.

During pelletizing step 122, steam may be introduced into the blended material in order to kill any remaining bacterial spores.

Next, in method element 124, the pellets in stream 117 of solid waste are coated with additional antimicrobial agent. Stream 117 is then cooled in method element 126 from the heating which occurs within pelletizing step 122. In method element 128, stream 117 undergoes compartmentalized buffering to permit adjustment of the density and friction angle of an output stream 119 of pellets. Variations in the content of MSW input to embodiment 100 may occur daily or even more frequently, and buffering stream 117 into a number of parallel compartments for later blending provides another level of control to ensure that required material properties of fill-material 14, 14a are met.

Other embodiments of such final buffering may also be used such as a single large mixer which continually mixes the buffered material to smooth out the statistical variations in pellet material properties. The use of compartmentalized buffering is not intended to be limiting.

Finally, in method embodiment 100, pellets in stream 119 are blended in method step 130 and are ready for delivery as fill-material stream 121.

While the principles of this invention have been described in connection with specific embodiments, it should be understood clearly that these descriptions are made only by way of example and are not intended to limit the scope of the invention.

The invention claimed is:

1. A barrier-wall structure having a retaining wall with a front surface and a back support surface, the back support surface supported by backfill adjacent thereto, wherein the backfill is municipal solid waste processed into fill-material of biologically-inert compacted pieces, the municipal solid-waste fill-material meeting the American Association of State Highway and Transportation Officials Load and Resistance Factor Design (AASHTO LRFD) criteria for a backfill promulgated by the United States Department of Transportation as published in AASHTO LRFD Bridge Design Specifications, 8th Edition, September 2017, in Section 11.10.6.

2. The barrier-wall structure of claim 1 further including a plurality of vertically-spaced geosynthetic grid layers, the grid layers each having a proximal edge secured at the back support surface and extending therefrom into the fill-material, the vertically-spaced grid layers having the fill-material therebetween.

3. The barrier-wall structure of claim 1 wherein the processed municipal solid-waste fill-material includes an activated charcoal additive.

4. The barrier-wall structure of claim 1 wherein the processed municipal solid-waste fill-material includes at least one stabilizing material added thereto, thereby enhancing mechanical properties of the fill-material.

5. The barrier-wall structure of claim 4 wherein the processed municipal solid-waste fill-material includes an activated charcoal additive.

6. The barrier-wall structure of claim 1 further including a water-impervious liner below the fill-material and sloping toward a collection point.

* * * * *